[11] 3,557,373

| [72] | Inventor | Walther Hess |
| --- | --- | --- |
| | | Dilsberg-Neuhof, Germany |
| [21] | Appl. No. | 740,995 |
| [22] | Filed | June 28, 1968 |
| [45] | Patented | Jan. 19, 1971 |
| [73] | Assignee | Electro GmbH & Co. |
| | | Heidelberg, Germany |
| [32] | Priority | June 28, 1967 |
| [33] | | Germany |
| [31] | | 1,623,420 |

[54] METHOD AND CIRCUITS FOR REGULATING THE GAIN OF A PHOTOMULTIPLIER FOR LASER-TELEMETRY APPARATUS
8 Claims, 2 Drawing Figs.

[52] U.S. Cl. .................................................. 250/207,
250/199, 250/214, 330/42
[51] Int. Cl. .......................................................H01j 43/30,
H03g 3/24
[50] Field of Search............................................ 250/201,
207, 214, 71.5, 199; 330/42; 328/243; 340/189,
190

[56] References Cited
UNITED STATES PATENTS

| 2,854,583 | 9/1958 | Robinson .................... | 250/207X |
| 3,170,032 | 2/1965 | Evans et al................... | 250/207X |
| 3,240,334 | 3/1966 | Wyman et al................. | 250/207X |
| 3,393,319 | 7/1968 | Randall et al................. | 250/207 |

*Primary Examiner*—Roy Lake
*Assistant Examiner*—E. R. LaRoche
*Attorney*—Waters, Roditi, Schwartz & Nissen ABSTRACT: Apparatus is provided for use in laser-telemetry equipment by means of which a photomultiplier has its gain controlled according to the intensity of the prevailing background radiation. The magnitude of the background radiation is converted into a voltage which in turn is used to control a high-voltage source coupled to the photomultiplier. The noise can be received directly through the photomultiplier or a receiver having the same field of view as the photomultiplier may be employed.

METHOD AND CIRCUITS FOR REGULATING THE GAIN OF A PHOTOMULTIPLIER FOR LASER-TELEMETRY APPARATUS

DRAWING

FIG. 1 is a block diagram of a circuit for practicing the method of the invention; and FIG. 2 shows a further circuit arrangement which constitutes a variant of the arrangement shown in FIG. 1.

DETAILED DESCRIPTION

Figure 1:
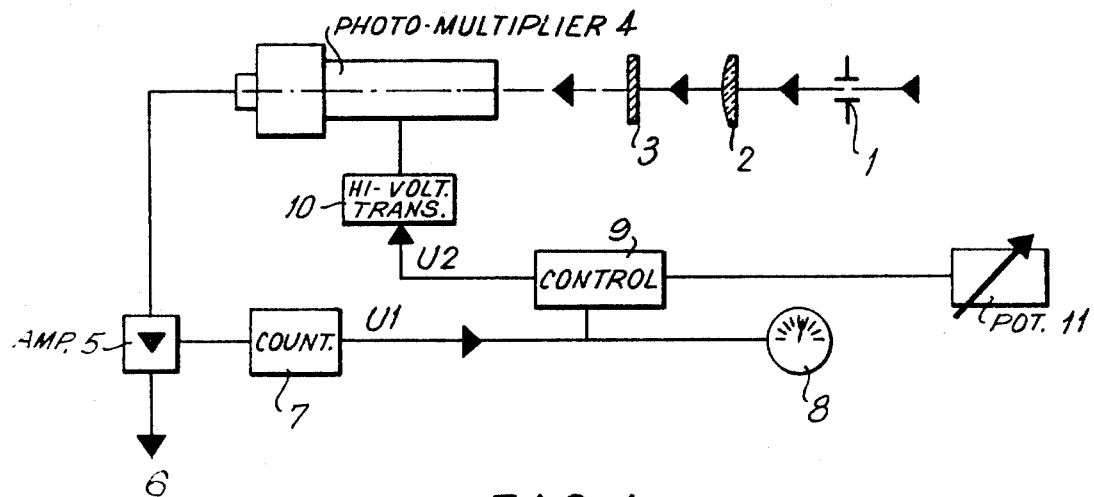

An object of the invention is to provide a method for regulating the gain of the photomultiplier, especially for use in laser-telemetry equipment, and also to provide circuitry for the application of this method.

In laser-telemetry units having giant-impulse lasers, telemetry is based on measurement of the transit time of a laser impulse from the instant of emission to the instant of reception after reflection from a target. The measurement of this transit time is effected by electronic means with the utilization of a quartz oscillator. On the basis of the speed of light as the propagation speed of the laser impulses, the distance covered is calculated from the measured transit time.

The laser emission pulse can, for example, be generated in a ruby crystal excited by the light of a suitable flash lamp in known manner.

For generating an extremely short and high-powered laser impulse, a special triggering mechanism, the so-called Q-circuit, is used. This involves a prism which is made to rotate at very high speed. Shortly before the prism attains its active position, the flash lamp is triggered and the inversion of the active material is initiated. Upon the prism's reaching its active position, the laser emission impulse then issues from the laser system, traverses the laser optics and is finally radiated through the beam window of the telemetry unit.

The transmitted laser impulse, after striking the object to be telemetered, is diffusely reflected by same so that a fraction of the laser energy returns to the telemetry unit where it is received by a built-in photomultiplier which generates a corresponding signal output. The difference in time between the instant of transmission and reception of the laser impulse is determined by an electronic evaluation circuit connected to the photomultiplier. For the maximum range $R_{max}$ of a lasar-telemetry unit of this kind, the following relationship applies:

$$R_{max} = \sqrt{\frac{D^2 \cdot \epsilon \cdot T \cdot P_s}{4 P_{Emin}}}$$

where:

D = the diameter of the receiving objective
$\epsilon$ = the remission coefficient of target
T = $e^{-2\alpha R}$, the transmission of the atmosphere (with $\alpha$ = the extinction coefficient, and R = the distance of target)
$P_s$ = power transmitted $P_{Emin}$ = he minimum power which the photomultiplier is capable of receiving If in this equation, the values D, $\epsilon$, T and $P_s$ are considered as predetermined and constant, there follows:

$$R_{max}^2 = \frac{1}{P_{Emin}}$$

i.e. the square of maximum range is inversely proportional to the minimum power receivable. In order to attain the greatest possible range, the minimum power usable at the receiving end must be as small as possible. This minimum power, however, is limited by the noise in the photomultiplier. Essentially, the noise level in the photomultiplier is determined by the background radiation.

In order to exclude, as far as possible, erroneous measurements due to incoming background radiation during the telemetry operation, it is customary to arrange for an incoming impulse to be evaluated as a usable signal only if the amplitude of the output voltage furnished by the video amplifier following the photomultiplier exceeds a certain threshold value.

The probability that, during the transit time of the laser measuring impulse, a noise impulse resulting from background radiation could exceed the preset threshold value and thus cause an erroneous measurement, largely depends on the conditions of background radiation, which can vary very widely.

With laser-telemetry equipment of already demonstrated efficiency, it is customary to adjust its sensitivity in such a manner that even with the severest background conditions (e.g. sun-illuminated clouds or strong stray reflection of sunlight into the reception objective of the unit) the probability of measuring errors will not exceed a certain limit. This, however, results in the essential disadvantage that it is not possible to extend the useful range of such equipment beyond a certain limit.

This is where the invention comes in. It is concerned with the problem of considerably improving the sensitivity and the range of laser-telemetry equipment of the kind heretofore described. The method for regulating the gain of a photomultiplier, especially in laser-telemetry equipment, consists according to the invention in setting the gain as a function of the intensity of prevailing background radiation.

This procedure makes it possible to adapt the receiving sensitivity of a laser-telemetry unit, of the kind initially described, to the intensity of background reflection prevailing at any moment. According to a further characteristic of the method according to the invention, provision is made for decreasing the gain of the photomultiplier with increasing intensity of background radiation and to increase it with decreasing background radiation.

This arrangement results in the very important advantage that, independently of the intensity of background radiation, the probability for a faulty measurement or an erroneous indication by a noise impulse exceeding the threshold setting is held to a constant value.

If the intensity of the incident background radiation is relatively small, the method of the invention permits increasing the maximum range of the equipment considerably, while the probability of erroneous indication remains constant. Combined automatically with such a range increase is an increase in sensitivity, which becomes considerably better than that of an ordinary laser-telemetry unit in which the sensitivity of the photomultiplier has been preset to a predetermined value.

According to an appropriate further development of the method of the invention, the adjustment value for setting the gain of the photomultiplier is derived from the number of noise impulses received within a time unit, whose intensities exceed the predetermined threshold value. The adjustment or regulating value is fed to a control device which affects the high-voltage supply to the photomultiplier in a corresponding manner.

The characteristics of the invention already mentioned, as well as further features, are next explained with reference to the drawing.

The laser radiation diffusely reflected by the target to be telemetered and the prevailing background radiation enter the input objective of the telemetry unit and is conducted, as can be seen in FIG. 1, to the photomultiplier 4.

A field-limiting stop 1 arranged in the ray path limits the viewing angle of the photomultiplier. Between a lens 2 and photomultiplier 4, an optical narrow-band filter 3 is interposed. This has the function of letting only the radiation of a desired spectral range (of the transmitter) penetrate to the cathode of the photomultiplier 4.

The photomultiplier 4 is connected to a feedback circuit by means of which, according to the invention, the sensitivity setting of the photomultiplier 4 is modified as a function of the intensity of the background radiation.

The output signal of the photomultiplier 4, amplified by a video amplifier 5, is fed through the channel 6 to a special electronic evaluation circuit, which takes care of further processing of this signal for the purpose of determining the distance which is being sought.

On the other hand, the video amplifier 5 is followed by an electronic impulse counter 7 which, during a certain time interval, for example from 0.1 to 1.0 seconds counts the number of noise impulses received, whose amplitudes exceed a predetermined threshold value of, for example, 1 volt.

The impulse counter 7 is an integrator set for a certain time of integration. It can be locked out for the short time of the telemetry operation (transmission and reception of a laser impulse). On the other hand, its time constant can be so great that it will not respond to the very short laser-echo impulses.

The impulse counter 7, depending upon the number of noise impulses received, delivers a proportional voltage $U_1$, which serves as regulating value for the control device 9. The control device 9 then modifies the voltage $U_2$ which is an input to a high-voltage transformer 10 in proportion to the value of the regulating voltage $U_1$ prevailing at any given moment.

The high-voltage transformer 10 is a part of a DC voltage transformer (not shown) which generates the high DC voltage of 1.6 kv. needed for operation of the photomultiplier. Additionally, there is provided a potentiometer 11 connected to the control device 9, which serves for setting the desired limit value of probability of faulty measurements or erroneous indications tolerated.

Thus, it is possible by means of the potentiometer 11 to modify manually, according to each particular case, the permissible probability of receiving an erroneous indication from the evaluating electronics, due to noise impulses exceeding the preset threshold for the input.

In order to make immediate information available concerning the degree of error probability for which the unit is adjusted at any given moment, this probability setting is continuously displayed by a separate indicating instrument. This indicating instrument 8, which, for example, can be a voltmeter or a digital indicating device, is supplied directly with the regulating voltage $U_1$.

Figure 2:
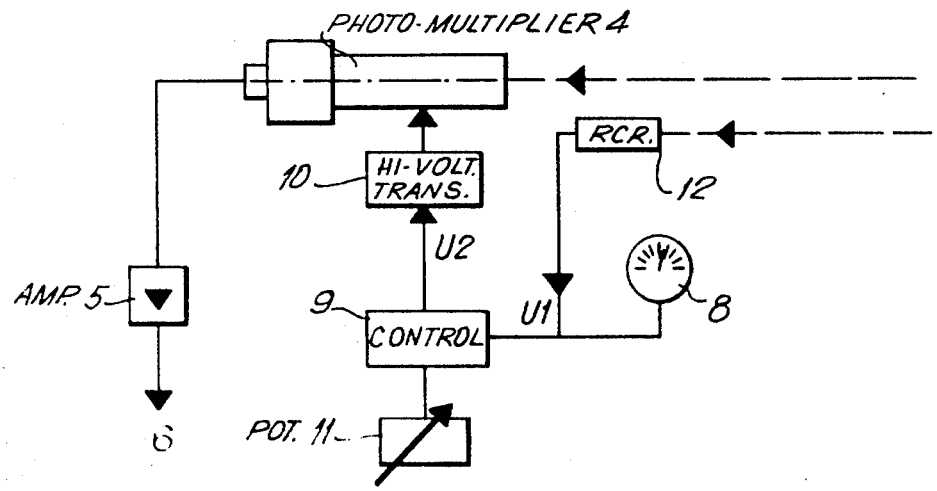

Apart from the circuit of FIG. 1, which includes a feedback circuit, and which has the great advantage that the intensity of prevailing background radiation is considered for the pertinent spectral range only on account of the fact that both the laser-echo impulses and the background radiation are received by the same receiver, i.e. the photomultiplier 4, and amplified by the sequential video amplifier 5, another embodiment which can be considered within the scope of this invention is shown in FIG. 2.

In this alternate embodiment, an additional receiver 12 is used for receiving the background radiation, which has the same viewing field as the photomultiplier 4.

This receiver 12 may be a photodiode or a photocell and may, in connection with an associated output circuit, determine the intensity of the background radiation integrated over a certain time interval, and furnish a corresponding regulating voltage to the control device 9.

Also in this case, the error-probability permitted by the corresponding potentiometer setting, is separately indicated by a suitable indicating instrument 8. Indicator 8 and control device 9 are both connected to the receiver 12.

I claim:

1. A method for regulating the gain of a photomultiplier, especially in laser-telemetry equipment, said method comprising: controlling the gain of the photomultiplier according to the intensity of the prevailing background radiation by converting the magnitude of the background radiation into a voltage; and utilizing the voltage to control a high voltage source coupled to the photomultiplier.

2. A method according to claim 1, wherein the converting of the background radiation into a voltage is effected from the number of selected noise impulses due to background radiation received per unit time; said impulses being selected according to whether their amplitudes exceed a critical threshold value.

3. A method according to claim 2, comprising manually adjusting the threshold value.

4. A method according to claim 3 comprising displaying error-probability.

5. A method according to claim 1, comprising receiving both laser-echo impulses and the background radiation by said photomultiplier.

6. Apparatus comprising receiving means for receiving reflected light signals and including a photomultiplier to amplify said signals; gain control means coupled to said photomultiplier to control the gain thereof; said control means including a counter coupled to said photomultiplier and a control voltage generator coupled to and responsive to said counter; said gain control means being coupled to and controlled by said generator.

7. Apparatus as claimed in claim 6, comprising a manual control means coupled to the generator to adjust the response thereof.

8. Apparatus as claimed in claim 6, wherein the counter is an integrator and said generator generates a voltage inversely proportional to that of said integrator.